Patented Nov. 17, 1931

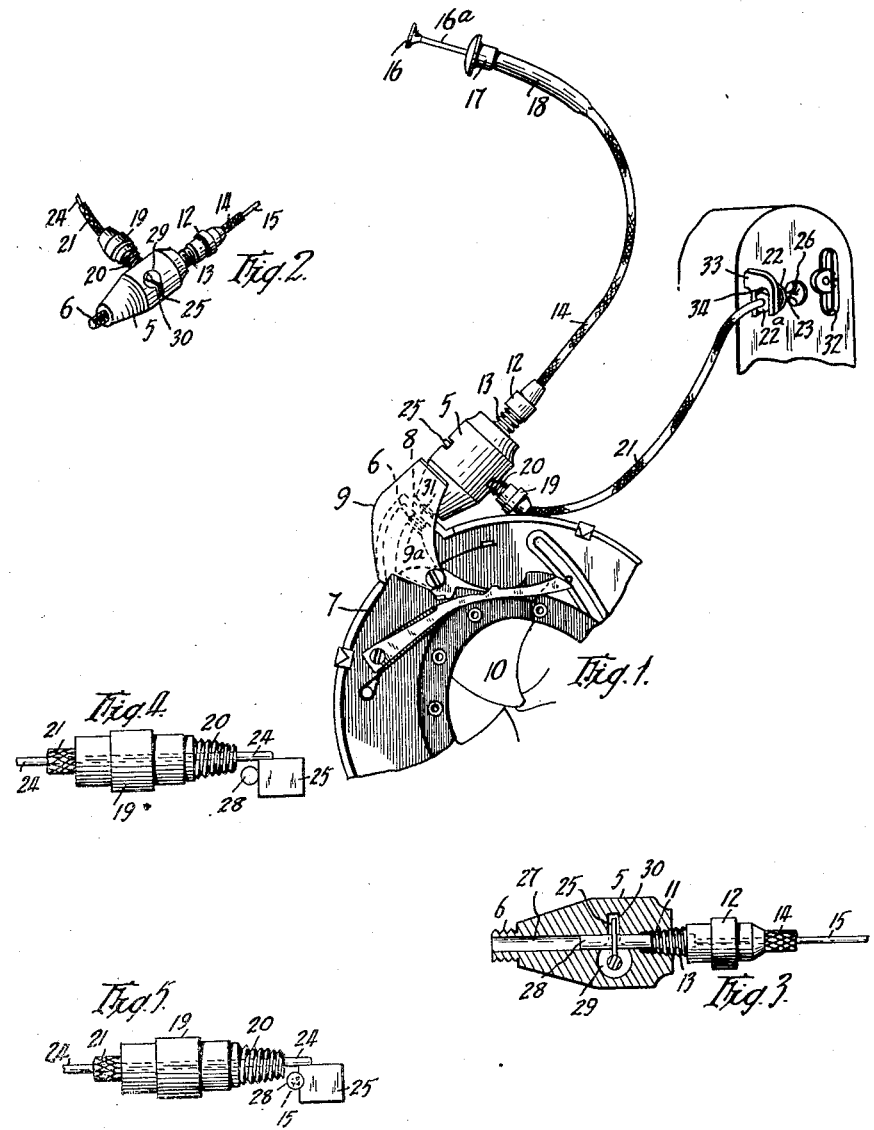

1,831,874

UNITED STATES PATENT OFFICE

HENRY CHARLES FRANK MORANT, OF ST. KILDA, VICTORIA, AUSTRALIA

MEANS FOR CONTROLLING THE EXPOSURE SHUTTERS OF PHOTOGRAPHIC CAMERAS

Application filed April 30, 1930, Serial No. 448,551, and in Australia December 13, 1929.

This invention has reference to a camera attachment the use of which will reduce to a minimum liability of the exposure of a film or other light sensitive surface more than once.

The object of the invention is to provide means whereby upon the operation of the camera shutter mechanism, to make an exposure, the means to be hereafter fully explained will function and prevent the shutter opening until the shutter-locking device button adjacent the winding key has been depressed.

The basic principle underlying the invention consists in the co-ordination between shutter release mechanism and film winding means, of means to prevent the said shutter being operated twice in succession without first removing an obstruction from the path of the shutter release mechanism.

An essential feature embodied in the invention consists in attaching a relatively small union to that part of the casing enclosing the camera shutter mechanism, normally occupied by the bulb attachment, and adapting said union so that it will secure a shutter release cord and a shutter locking device the character and function of which will be fully explained, said locking mechanism operating in combination with the shutter release cord so that on the film being wound to present an unexposed surface to the lens, the locking mechanism is moved clear of the shutter release cord allowing it to act upon the shutter mechanism to operate same, which immediately brings the locking mechanism into operation again to minimize liability of a further exposure being made on the film until the shutter-locking device button has been depressed.

In order to more readily understand the invention reference will now be made to the accompanying drawings in which:—

Figure 1 is an enlarged fragmentary view showing my invention in position on a camera shutter casing, and showing also the position of the device in relation to the camera shutter.

Figure 2 is a perspective view showing more particularly the union and its attachments.

Figure 3 is a sectional view through the union showing the parts in position.

Figures 4 and 5 are views showing the "before operating shutter" position and "after operating shutter" respectively, and Figure 6 is an essential detail.

The present invention will be described for use with a film camera which incorporates a pair of rollers upon which a film is wound, such film being lettered or numbered at predetermined intervals of its length, said numbers or letters being visibile to the operator by providing a ruby port at the back of the camera, a winding key being disposed at one side of the camera case whereby the film retaining roller is rotated, the present invention being adapted to co-operate with the said key and the shutter release mechanism as will be explained.

According to this invention I provide a union 5 from suitable metal and which is preferably plated with some non-oxidizable material such as nickel, said union 5 being provided with an integral threaded extension 6 which screws into the casing 7 at the position 8 immediately above the trigger 9 for operating the shutter 10.

The union 5 is threaded internally at 11 to receive a nipple 12 which is provided with a threaded extension 13 for engagement with said union 5, said nipple 12 having attached thereto the fabric or other casing 14 of a flexible wire 15 connecting a press button 16 on a rod 16ª which passes through a metal or fibre cap 17 retaining a return spring (not shown) within the enlarged portion 18 of the casing 14.

At one side of the union 5 is a further nipple 19 similar in shape and size to the nipple 12 in that it has a threaded extension 20 for engagement with the union 5 and has attached thereto a fabric or other casing 21 provided at its extremity with a metal cap 22 having an integral sleeve 22ª through which a rod 23 passes the said rod 23 connecting a flexible wire 24 which at the nipple end is fitted with a blade portion 25 (Figure 6), the upper end of said wire 24 connecting the said rod 23 as explained, a button 26 being fitted to said rod 23 for the purpose of operating the said wire 24 and also the blade member 25.

Actually the button 16, rod 16ª, cap 17, and flexible wire 15 within the casing 14 is established practice since it is well known to operate a camera shutter by means of an attachment such as this.

The union 5 is provided with a bore 27 within which a piston 28 operates, said piston 28 being directly connected to the flexible wire 15, so that any pressure bearing upon the button 16 causes a movement of the piston 28 along the bore 27.

Bisecting the bore 27 is a bore 29 provided with a slot 30 within which the blade 25 is disposed and operates, the bore 29 being threaded to receive the nipple extension 20.

The shoulder 31 of the camera shutter casing 7 is tapped to receive the extension 6 of the union 5 and when the parts are in position they occupy a position as shown in Figure 1.

Juxtaposed to the winding key 32 of the camera is a bracket 33 provided with a slot 34 adapted to receive the shoulder 22ª on the casing 21 in such a manner that when in position the button 26 will be brushed by the winding key 32 when same is rotated to wind the film, and this arrangement forms the important feature of my invention.

With the device fitted to a camera in the manner shown in Fig. 1, the operation is as follows:—

When the film is wound to the desired position and the subject to be photographed chosen, the winding key 32 makes contact with the button 26 and depresses it, causing the blade 25 to move forwardly and allow the piston 28 to move into engagement with a portion 9ª (Figure 1) of the trigger when the press button 16 is depressed to its fullest extent. This operation causes the shutter to be released and the photograph is taken.

Immediately this happens the portion 25ª of the blade 25 engages with the flexible wire 15 of the piston 28, the shoulder 28ª behind the said piston 28 impinging on the said blade 25 and preventing the withdrawal and return of the piston 28, which now becomes locked as shown in Fig. 6, so that the trigger 9 cannot be operated since the piston 28 by not returning to its normal operating position shown by Figs. 3 and 4, loses its stroke and therefore fails to function.

When it is desired to take a further photograph it is necessary to rewind the spool bringing a fresh number or letter into view through the port at the back of the camera, and in performing this operation the winding key 32 again contacts with the button 26 and depresses it, and in so doing moves the blade 25 forwardly and allows the piston 28 to return to the position shown in Figure 4, so that pressure on the button 16 allows the piston 28 to impinge on the trigger portion 9ª and again the shutter mechanism functions in the manner well known.

The sequence of operations above set out are for the "instantaneous" setting of the shutter, the operation for the "time exposure and bulb" setting being substantially the same with the exception however, that when the shutter is set for these positions it normally requires two distinct trigger operations to effect firstly the opening of the shutter and secondly the closing of same, the second operation being a return of the stroke and a relatively light pressure since it is merely a releasing operation.

Therefore when the shutter 10 is set for "bulb" and the button 16 depressed, the first operation opens the shutter 10, and when the desired time has elapsed and the pressure removed from the button 16, the piston 28 slides backwardly and releases the pressure on the trigger 9 and the shutter closes.

The position of the piston 28 and blade 25 now becomes the same as already explained with reference to the "instantaneous" exposure, i. e. the blade 25 engages with the wire 15 and immediately behind the shoulder 28ª of the said piston 28 preventing the return thereof until the film is again wound bringing the resetting function into effect as already explained.

The "time" exposure is somewhat similar in that there are two distinct pressures necessary on the trigger 9 to effect the opening and closing of the shutter 10.

In the "time" position the piston 28 first impinges on the trigger 9 upon pressure being applied on the button 16, and opens the shutter 10. This function only requires a certain travel of the trigger 9, and on the correct time elapsing the piston 28 is again operated by means of the button 16, the piston leaving the position shown in Fig. 6, to again engage the trigger 9. This operation closes the shutter, and the piston 28 returns again to its position illustrated in Fig. 6, making it impossible to operate the trigger until the button 26 is again depressed.

As already set forth the main object of the invention is to prevent one light sensitive surface being subjected to two separate exposures, reasonable care being exercised, thus saving possibly a valuable photograph which would otherwise be spoiled, and by disposing a means in the path of the camera trigger which will prevent more than one complete exposure being made the likelihood of injury to the film is eliminated.

Furthermore where portion of a film has been exposed and the camera put aside for a time it is very difficult to determine whether the number showing on the film has been exposed or whether the film was moved immediately after taking it and before the camera was put away, unless of course the matter is entered in a diary.

With this invention all doubt is removed for the reason that the position of the trigger indicates whether the shutter-locking device button has been depressed by the film-winding key, reasonable care being exercised causing a fresh exposure or otherwise thus reducing to a minimum risk of double exposure and other equally possible occurrences.

I claim:—

1. A camera attachment for the purposes indicated, comprising a union fitted on a shoulder of the casing enclosing the shutter mechanism, said union having a central and a transverse bore, the central bore being tapped for portion of its length to receive a threaded nipple disposed upon one end of the casing of a flexible wire, the opposite end of which accommodates a rod and button, a piston within the central bore of said union and on the one end of the said flexible wire, a nipple disposed in the transverse bore of the union, and the fabric cover of another flexible wire attached to said nipple, the last mentioned flexible wire having a blade attached to the end thereof disposed in the union, the opposite end of said wire having a rod to which is secured a button for operating the said blade as described.

2. A camera attachment for the purposes indicated comprising a union received by a shoulder on the casing enclosing the shutter mechanism of a camera, said union having a central bore in which a piston operates under control of a flexible wire terminated by a button, the said piston being adapted to impinge on the trigger of the camera shutter to operate same, in combination a blade member actuated by a flexible wire terminated by a button disposed adjacent a winding key of a camera, whereby on the rotation of said key the button is depressed and moves the blade clear of the said piston which by means of its operating button engages the trigger for moving the camera shutter as described.

3. A camera attachment for the purposes indicated comprising a union received by a shoulder formed on a casing enclosing the shutter mechanism of a camera, said union accommodating a piston and a co-acting blade member arranged relatively to the piston in such a manner that the said piston cannot operate the trigger portion of a camera shutter, means for setting the piston and blade respectively, comprising flexible encased wires, said wires being terminated by buttons, the button of the wire connecting the blade member being positioned adjacent the winding key of the camera, whereby upon the rotation of the said key said button is depressed to move the associated blade member clear of the piston as described.

4. In a camera attachment for the purposes indicated camera-shutter controlling means comprising a piston operable by a button and a flexible wire in the bore of a union connecting the shutter casing, so that said piston will impinge upon a trigger member, and a blade member arranged transversely of the path of the piston so that on the completion of an exposure the blade will voluntarily move relatively to the piston in such a manner that a shoulder on the said piston will engage with the track of said blade and retain the said piston against further movement until the button on the flexible wire connecting the said blade is depressed, said blade being moved forwardly to release the piston and allow it to recede to the normal operating position.

5. A camera attachment for the purposes indicated, characterized by a rigid blade portion disposed in the path of a piston adapted for operating a camera trigger, so that after an exposure is complete the piston becomes held by the said blade, means for releasing said piston from engagement with the said blade, said means including a flexible wire terminated by a button mounted adjacent a film winding key so that upon the rotation of said key the button is depressed and moves the blade clear of the piston and allows it to return to the operative position relative to the shutter as described.

In testimony whereof I have affixed my signature to this specification.

HENRY CHARLES FRANK MORANT.